US008203836B2

(12) United States Patent  (10) Patent No.: US 8,203,836 B2
Chen et al.  (45) Date of Patent: Jun. 19, 2012

(54) COVER STRUCTURE

(75) Inventors: Hsin-Chih Chen, Taipei (TW);
Yun-Chung Chang, Taipei (TW);
Hsin-Chi Huang, Taipei (TW);
Meng-Wei Chen, Taipei (TW); Li-Wen Hsu, Taipei (TW); Ju-I Lee, Taipei (TW)

(73) Assignee: Asustek Computer Inc., Taipei (TW)

( * ) Notice: Subject to any disclaimer, the term of this patent is extended or adjusted under 35 U.S.C. 154(b) by 302 days.

(21) Appl. No.: 12/696,306

(22) Filed: Jan. 29, 2010

(65) Prior Publication Data
US 2010/0214731 A1  Aug. 26, 2010

(30) Foreign Application Priority Data

Feb. 20, 2009 (TW) .............................. 98105408 A

(51) Int. Cl.
*G06F 1/16* (2006.01)
(52) U.S. Cl. ........... 361/679.38; 361/679.6; 361/679.33; 312/223.1; 312/223.2; 720/655
(58) Field of Classification Search ............. 361/679.38, 361/679.58, 679.6; 720/655
See application file for complete search history.

(56) References Cited

U.S. PATENT DOCUMENTS

| | | | | |
|---|---|---|---|---|
| 5,924,782 | A * | 7/1999 | Park | 312/328 |
| 6,891,720 | B2 * | 5/2005 | Voon et al. | 361/679.31 |
| 7,254,821 | B2 * | 8/2007 | Chen et al. | 720/655 |
| 7,342,798 | B2 * | 3/2008 | Chen et al. | 361/724 |
| 7,490,337 | B2 * | 2/2009 | Lee | 720/647 |
| 2002/0186639 | A1 * | 12/2002 | Lee | 369/75.1 |
| 2004/0169997 | A1 * | 9/2004 | Voon et al. | 361/685 |
| 2005/0264989 | A1 * | 12/2005 | Chen et al. | 361/683 |
| 2006/0220504 | A1 * | 10/2006 | Zhao | 312/223.2 |
| 2007/0220533 | A1 | 9/2007 | Tamura | |
| 2008/0151508 | A1 | 6/2008 | Chen et al. | |

FOREIGN PATENT DOCUMENTS

| | | |
|---|---|---|
| CN | 2658905 Y | 11/2004 |
| CN | 1971753 A | 5/2007 |
| TW | 335918 | 7/1998 |
| TW | 426318 | 3/2001 |
| TW | 592325 | 6/2004 |
| TW | M313293 | 6/2007 |

OTHER PUBLICATIONS

English translation of abstract of TW M313293.
English translation of abstract of TW 426318.
English translation of abstract of TW 335918.
English translation of abstract of TW 592325.
English translation of abstract of CN 2658905 Y.
English translation of abstract of CN 1971753 A.

* cited by examiner

*Primary Examiner* — Anthony Q Edwards
(74) *Attorney, Agent, or Firm* — Thomas, Kayden, Horstemeyer & Risley, LLP

(57) ABSTRACT

A cover structure is disposed at the electronic device. The electronic device includes a frame with an opening and a power supply. The cover structure includes a cover and a pivotal portion. The cover includes an inner surface, an outer surface, and a touch portion. The pivotal portion includes a pivotal part and a trigger. The pivotal part is located on the inner surface. The trigger is located at the opening of the frame and connected with the pivotal part. The touch portion corresponds to the opening. When the touch portion is pressed, the pivotal part drives the trigger to trigger the power supply to drive the electronic device.

6 Claims, 6 Drawing Sheets

COVER STRUCTURE

CROSS-REFERENCES TO RELATED APPLICATIONS

This non-provisional application claims priority under 35 U.S.C. §119(a) on Patent Application No. 98105408 filed in Taiwan, R.O.C. on Feb. 20, 2009, the entire contents of which are hereby incorporated by reference.

BACKGROUND OF THE INVENTION

1. Field of the Invention

The invention relates to a cover structure and, more particularly, to a cover structure of an optical disk drive (ODD).

2. Description of the Related Art

A computer device usually includes an ODD for reading a compact disk (CD) to read software or multimedia (such as music or a movie). Furthermore, appearance design of the computer device becomes gradually recognized. To make the overall appearance of the computer device become more beautiful and uniform, an ODD cover is disposed at the ODD. When the ODD is not used, the ODD cover covers the ODD. Therefore, the cover may be designed to cooperate with a casing of the computer device to make the overall appearance of the computer device more harmonious, compact, and neat. When a user wants to use the ODD, he only needs to press a button on the ODD cover, and a power supply of the ODD is triggered to make a tray of the ODD push the ODD cover away. Then, the user may put the CD on the tray to use the ODD.

A through hole is formed on a conventional ODD cover of an ODD structure with a cover to make the button expose from the ODD cover, and thus the user may press the button to operate the ODD to load or eject a CD. However, the above method makes the appearance of the computer device have the uncoordinated through hole and the button, and thus the aesthetic feeling of the appearance is destroyed.

Consequently, the ODD cover not needing the through hole is proposed to solve the problem caused by the through hole as stated above. However, since the ODD cover structure does not include the through hole for the button to be exposed, to obtain the function of the original button, a plurality of components cooperating with each other must be added to obtain the function of operating the ODD to load or eject the CD. As a result, not only the thickness of the ODD cover is increased, but also a cost is increased, which causes extra expense.

BRIEF SUMMARY OF THE INVENTION

The invention provides a cover structure disposed at the electronic device. The electronic device includes a frame with an opening and a power supply. The cover structure includes a cover and a pivotal portion. The cover includes an inner surface, an outer surface, and a touch portion. The pivotal portion includes a pivotal part and a trigger. The pivotal part is located at the inner surface. The trigger is located at the opening of the frame and connected with the pivotal part. The touch portion corresponds to the opening. When the touch portion is pressed, the pivotal part drives the trigger to trigger the power supply to drive the electronic device.

The cover structure and the touch portion are integrally formed according to the cover structure or an ODD module of the invention. That is, the cover structure does not need the through hole for the button to be exposed. As a result, an integrated design can make the appearance more beautiful, compact, and neat. Moreover, according to the cover structure of the invention, the ODD may be smoothly operated to load or eject the CD without needing to add a plurality of components like the conventional technology, and thus the cost can be saved.

These and other features, aspects and advantages of the present invention will become better understood with regard to the following description, appended claims, and accompanying drawings.

DETAILED DESCRIPTION OF THE EMBODIMENTS

Figure 1:
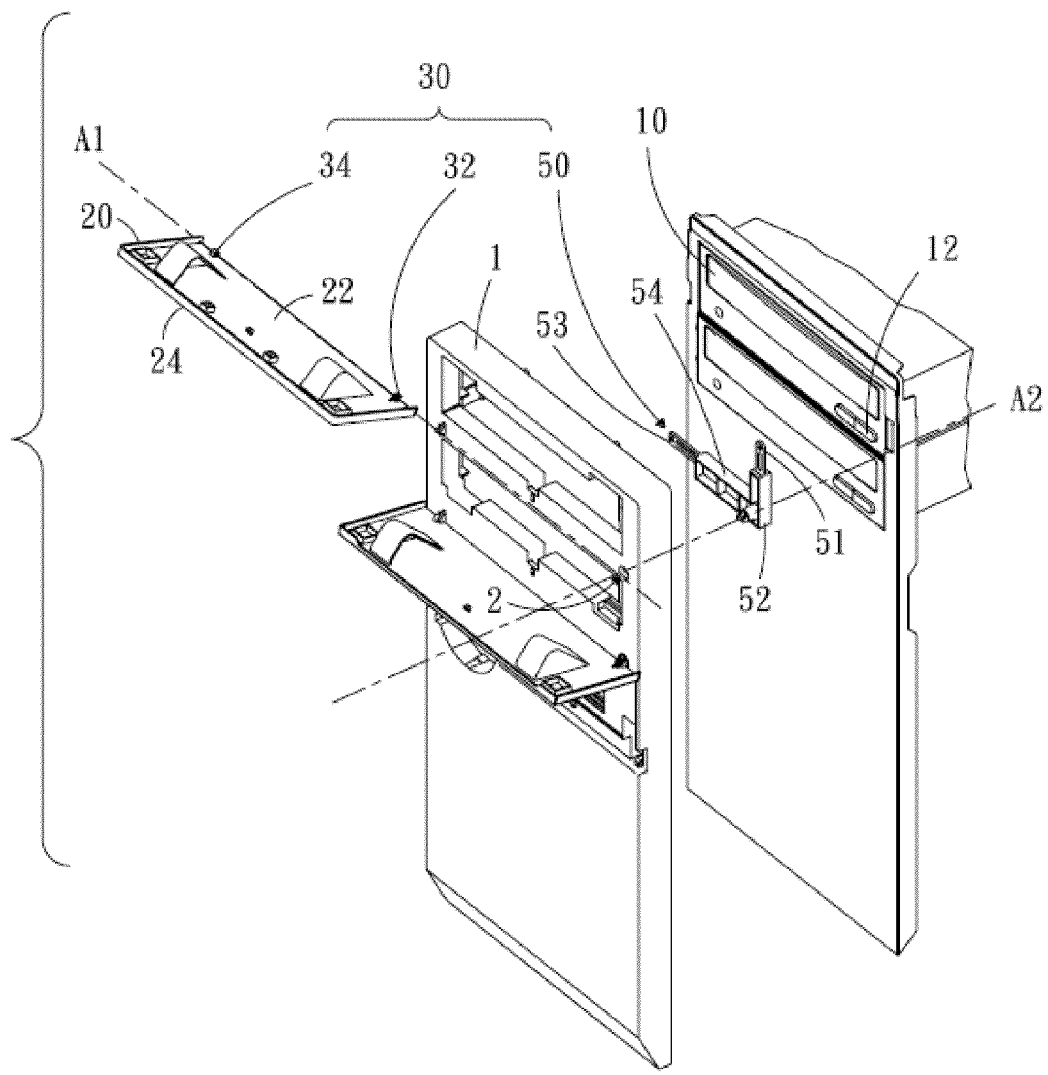
FIG. 1 is an exploded diagram showing a cover structure according to an embodiment of the invention.
Figure 2:
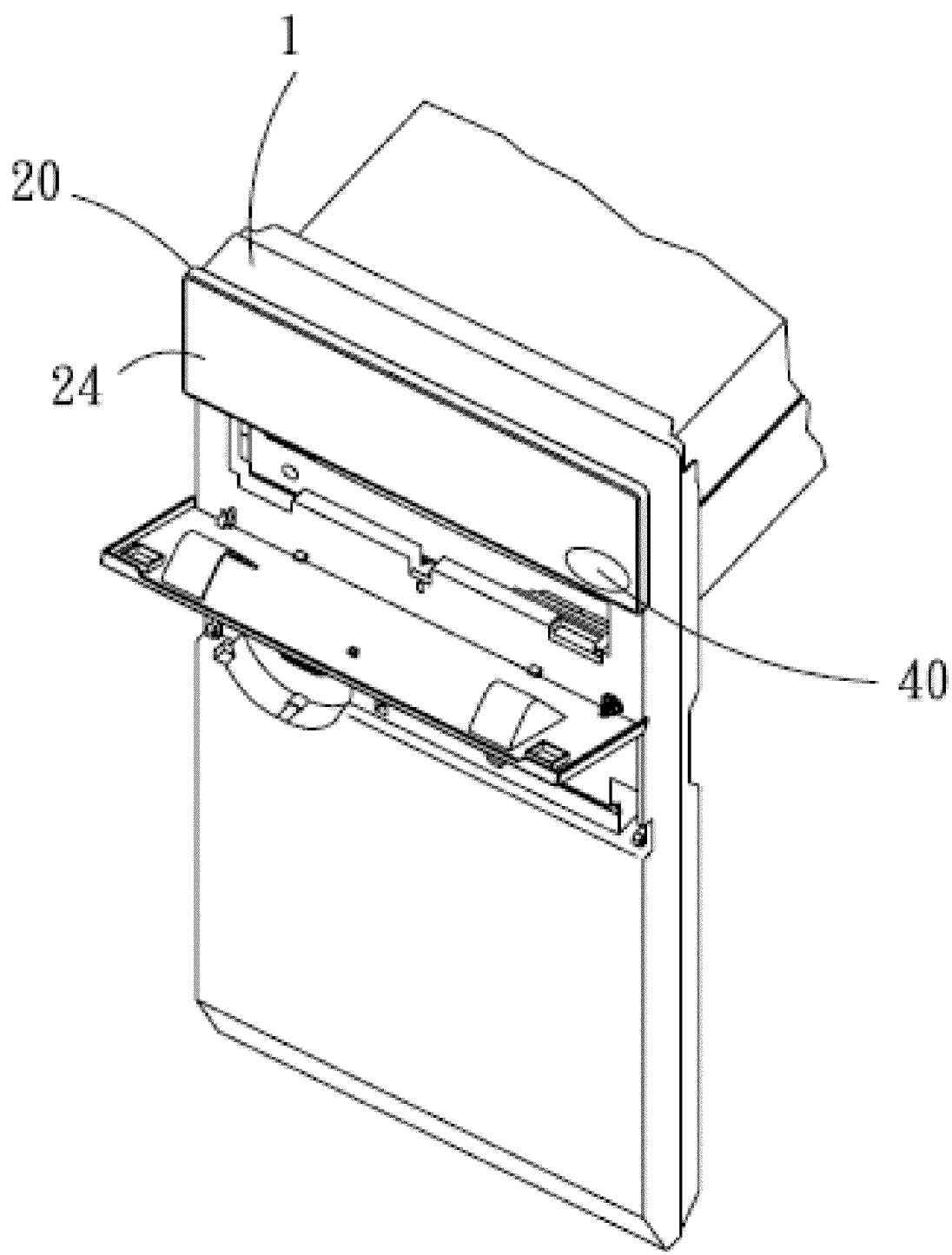
FIG. 2 is a three-dimensional diagram showing a cover structure according to an embodiment of the invention.

FIG. 1 is an exploded diagram showing a cover structure according to an embodiment of the invention. FIG. 2 is a three-dimensional diagram showing a cover structure according to an embodiment of the invention. A cover structure according to the invention is disposed at an electronic device 10. The electronic device 10 includes a frame 1 and a power supply 12, and the frame 1 includes an opening 2. The cover structure includes a cover 20 and a pivotal portion 30.

The electronic device 10 may be an ODD coupled with the computer device, but the invention is not limited thereto. The frame 1 includes a gap to cooperate with the electronic device 10 to load or eject a CD. When the electronic device 10 does not load or eject the CD, the cover 20 may cover the gap of the frame 1. When the electronic device 10 loads or ejects the CD, the cover 20 rotates to open, and thus the user conveniently put the CD in the electronic device 10.

The cover 20 includes an inner surface 22, an outer surface 24 corresponding to the inner surface 22, and a touch portion 40. The pivotal portion 30 includes pivotal parts 32 and 34 and a trigger 50. The pivotal parts 32 and 34 are disposed at a side of the inner surface 22. The pivotal parts 32 and 34 are not limited to be disposed at an underside of the inner surface 22 as shown in FIG. 1. The cover 20 is pivotally connected with the frame 1 via the pivotal parts 32 and 34. The trigger 50 is at the opening 2 of the frame 1 and connected with the pivotal part 32.

The touch portion 40 is disposed at the outer surface 24 and corresponds to the opening 2. As shown in FIG. 2, the touch portion 40 and the cover 20 are integrally formed. That is, the cover 20 does not need any through hole for the touch portion to be exposed. Thus, the cover 20 and the touch portion 40 form a plane in appearance. Therefore, the aesthetic feeling of the appearance is not affected, and the appearance is more compact and neat. Furthermore, when the touch portion 40 is pressed, the pivotal part 32 drives the trigger 50 to trigger the power supply 12 to drive the electronic device 10. If the electronic device 10 is the ODD, when the power supply 12 is triggered, the support tray (not shown) of the ODD is ejected to push the cover 20 away, and thus the cover 20 rotates along the pivotal parts 32 and 34 to open.

As shown in FIG. 1, a joint between the pivotal part 32 and the trigger 50 is a pivotal point. The other end of the cover 20 opposite to the touch portion 40 is fixed at the frame 1 via the other pivotal part 34. The joint between the pivotal part 34 and the frame 1 also is a pivotal point. Consequently, the rotating axis A1 is formed according to the pivotal points to allow the cover 20 to rotate along the rotating axis A1. In this embodiment, the electronic device 10 includes the two pivotal parts 32 and 34. The number of the pivotal parts may be increased or decreased according to demands, and it is not limited thereto. Additionally, a press axis A2 is formed in a direction perpendicular to the rotating axis A1 and the outer surface 24, and the touch portion 40 may be pressed along the press axis A2, which is illustrated in detail hereinafter.

The rotating axis of a conventional cover structure can only be provided for rotating the cover structure. That is, the joint between the cover structure and the frame is fixed and still. Therefore, even the button for opening the cover is disposed; it cannot be disposed at the pivotal point. As a result, the function of the button may be realized by assembling a plurality of other components. According to the invention, not only the rotating axis A1 for rotating the cover 20 is formed via the pivotal points, the press axis A2 perpendicular to the rotating axis A1 and the outer surface 24 also may be formed at a pivotal point between the pivotal part 32 and the trigger 50. As a result, the touch portion 40 may be disposed at a position of the outer surface 24 directly facing the pivotal point (that is, the position of the opening 2), and then the action path of the touch portion 40 is provided via the press axis A2 to trigger the power supply 12 of the electronic device 10, and thus the electronic device 10 is driven.

Figure 3A:
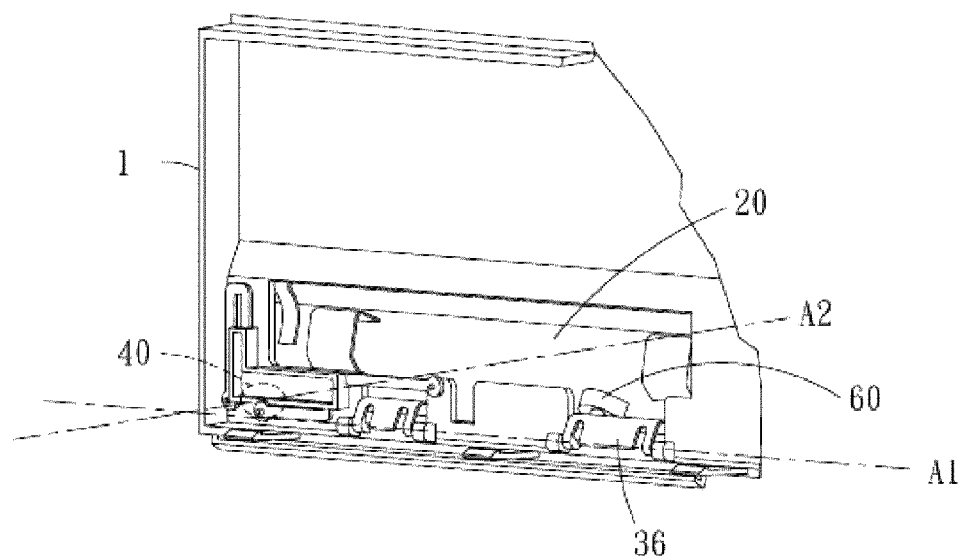
FIG. 3A and FIG. 3B are schematic diagrams showing actions of a shaft structure according to an embodiment of the invention.
Figure 3B:
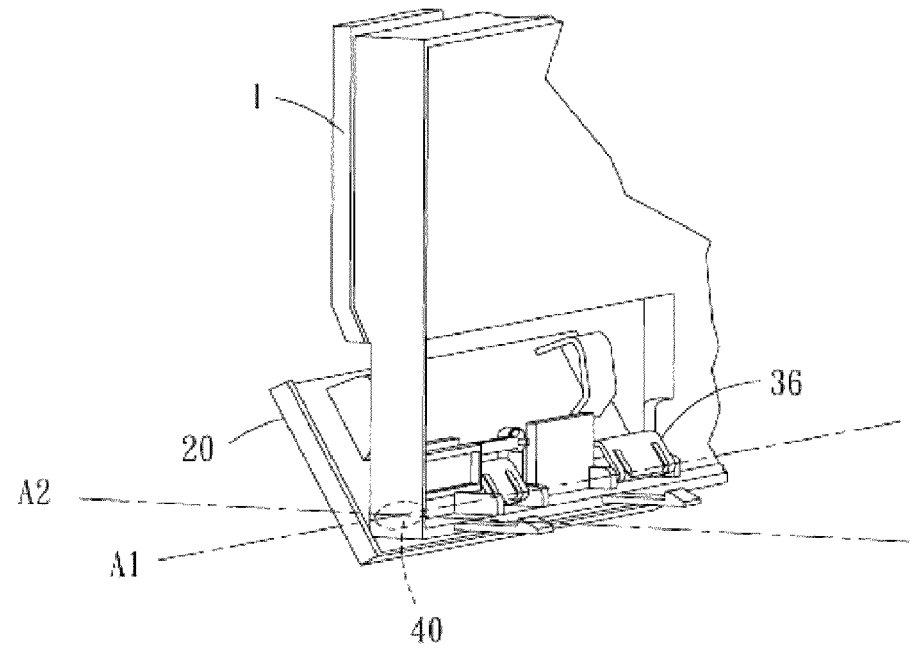

The press axis A2 via which the touch portion 40 is pressed forwards and backwards may be produced by elastic deformation of the cover 20 to make the touch portion 40 trigger the power supply 12 of the electronic device 10, and thus the electronic device 10 is driven. Moreover, the press axis A2 via which the touch portion 40 is pressed forwards and backwards also may be provided according to another embodiment of the invention. FIG. 3A and FIG. 3B are schematic diagrams showing actions of a shaft structure according to an embodiment of the invention. In this embodiment, the pivotal part 36 may be a hinge, the cover 20 also may be pivotally connected with the frame 1 via the hinge, and the rotating axis A1 for rotating the cover 20 may be formed via the hinge. The difference between this embodiment and the former embodiment is that the shaft structure 60 is added in this embodiment. The shaft structure 60 is connected with the pivotal part 36 and the cover 20. That is, the cover 20 may be combined with the pivotal part 36 via the shaft structure 60. The press axis A2 perpendicular to the rotating axis A1 and the outer surface 24 is formed according to the shaft structure 60. As a result, not only the cover 20 can rotate to open via the rotating axis A1, but also the touch portion 40 may be moved along the direction of the press axis A2 formed via the shaft structure 60 to obtain the function of pressing forwards and backwards.

Figure 4A:
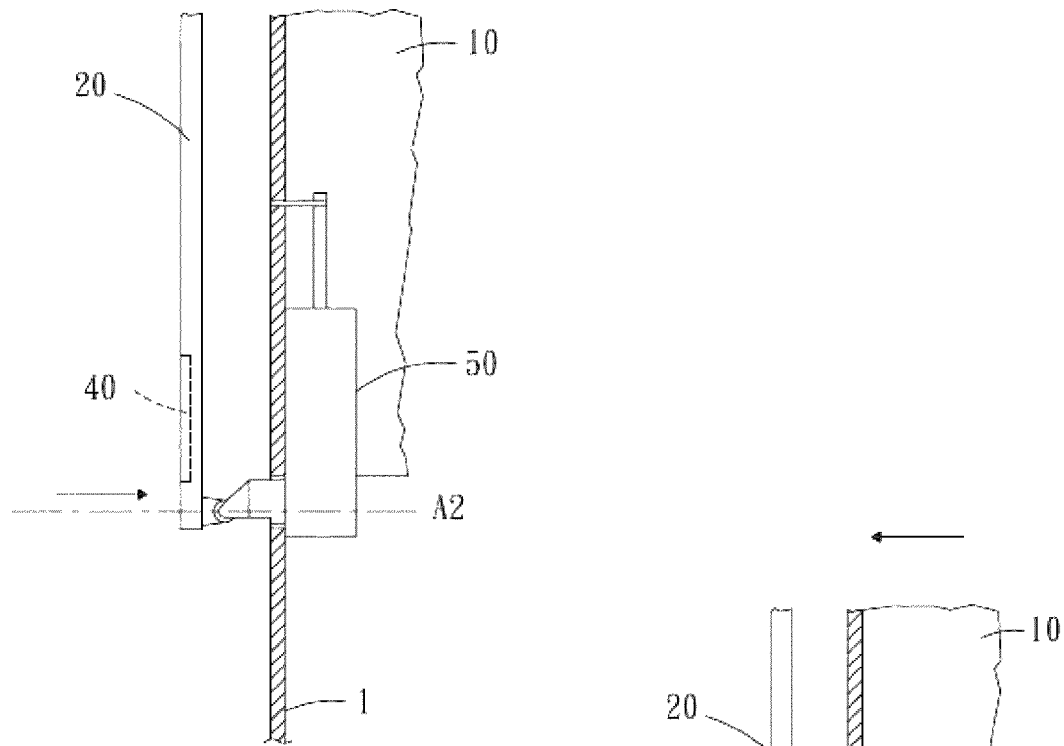
FIG. 4A~FIG. 4C are schematic diagrams showing actions of a cover structure according to an embodiment of the invention.
Figure 4B:
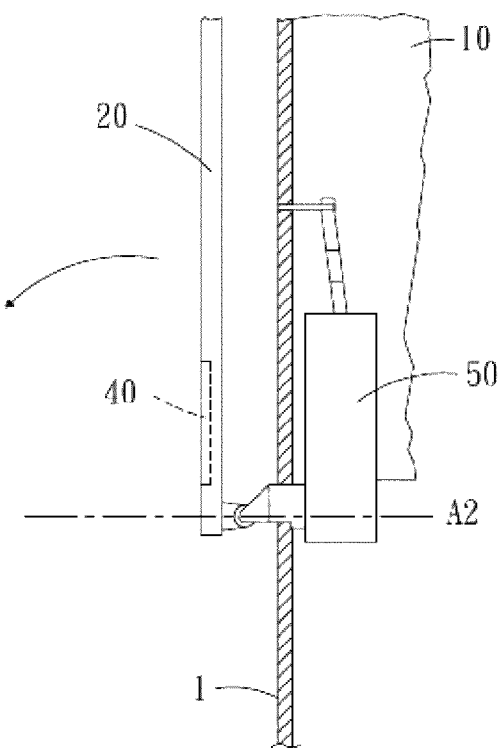
Figure 4C:
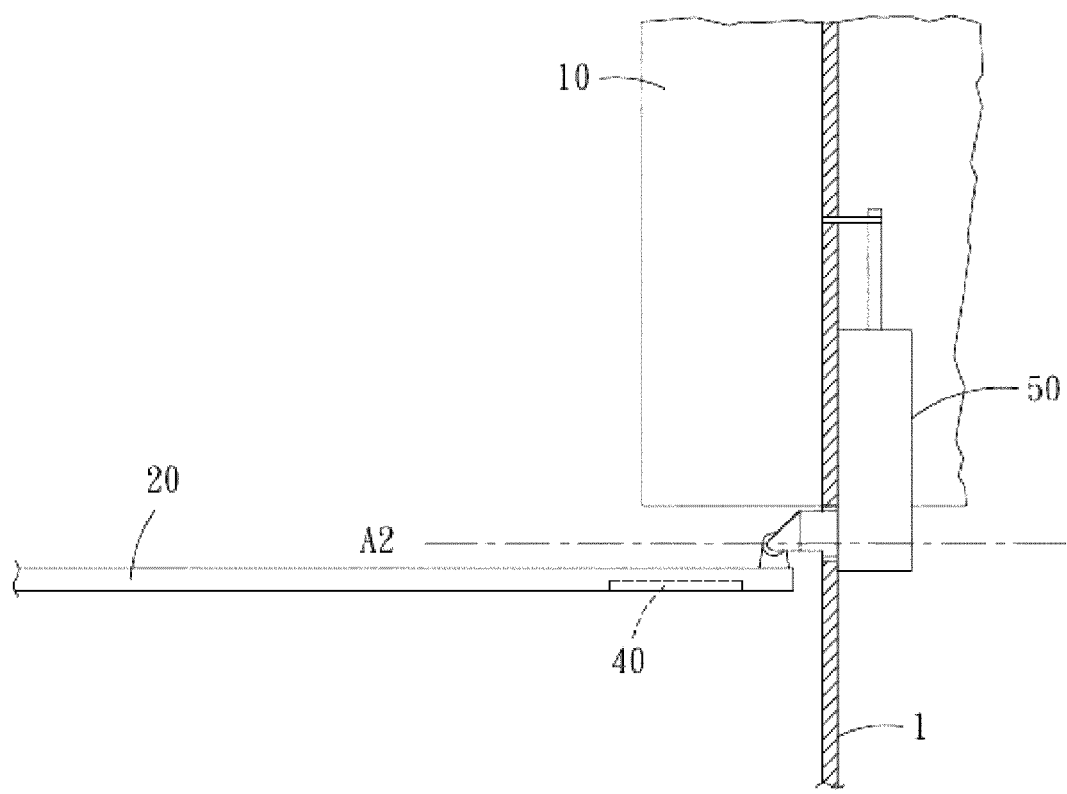

Actions of a cover structure are illustrated accompanying FIG. 4A to FIG. 4C. The actions of the cover structure are illustrated via sectional diagrams. In FIG. 4A, the cover structure does not act. That is, the touch portion 40 on the cover 20 is not pressed, and the cover structure is closed. When the user presses the touch portion 40 on the cover 20, the trigger 50 is driven to deform the trigger 50 as shown in FIG. 4B. At the time, the trigger 50 touches the power supply of the electronic device 10 due to its deformation, and thus the electronic device 10 is turned on. If the electronic device 10 is the ODD, after the power supply is triggered, the support tray (not shown) of the ODD is ejected to push the cover 20 away directly and rotate the cover 20 to open as shown in FIG. 4C. As a result, the user may put the CD in the ODD.

Figure 5:
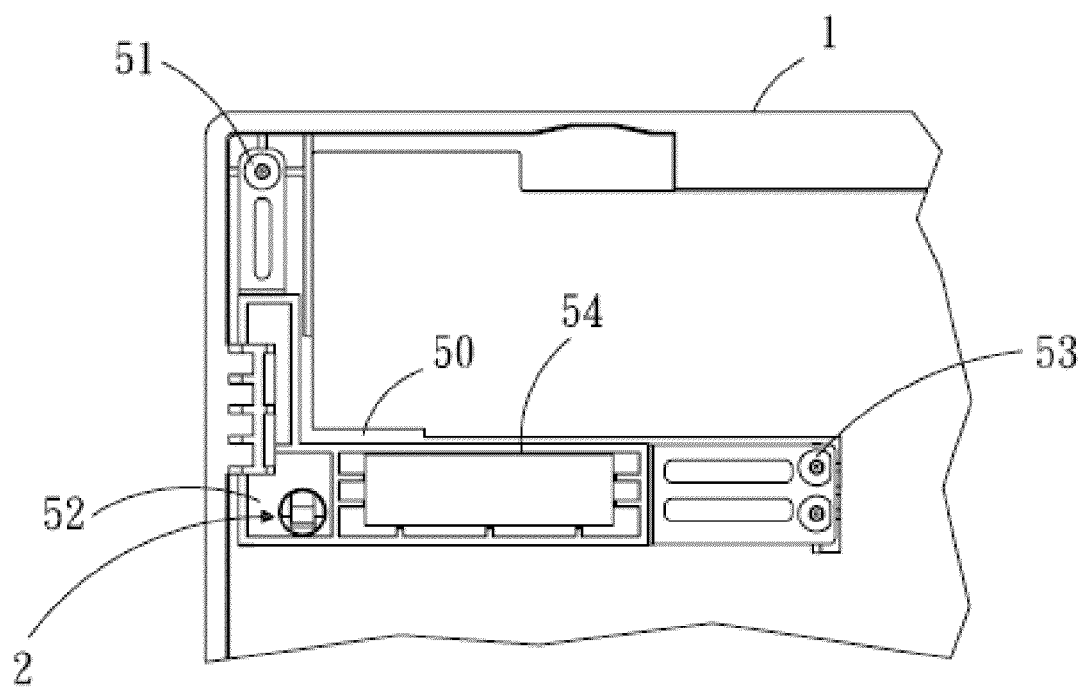
FIG. 5 is a partial sectional view showing a cover structure according to an embodiment of the invention.

FIG. 5 is a partial sectional view showing a cover structure according to an embodiment of the invention. The partial sectional view is drawn by viewing the cover structure in the direction of the frame 1 to the cover 20. That is, FIG. 5 is a rear view of the cover structure. As shown in FIG. 1 and FIG. 5, the other end of the trigger 50 opposite to the end of the trigger 50 connected with the pivotal part 32 includes an extending portion 54, and the extending portion 54 is disposed to cooperate with the position of the power supply 12. That is, when the touch portion 40 is pressed to make the pivotal part 32 drive the trigger 50, the extending portion 54 of the trigger 50 touches the power supply 12 to drive the electronic device 10.

In FIG. 5, the connection state of the trigger 50 is illustrated according to an embodiment of the invention. As shown in FIG. 5, the trigger 50 is L-shaped, and thus it includes three ends 51, 52, and 53. The shape of the trigger 50 may be changed according to practical demands, and it is not limited thereto. One end of the trigger 50 corresponding to the touch portion 40, that is, the end 52 (also as show in FIG. 1) of the trigger is not fixed at the frame 1, all the other ends 51 and 53 are fixed at the frame 1 in a mode such as hot melt. That is, the ends 51 and 53 of the trigger 50 are fixed at the frame 1 via the hot melt, and only the end 52 of the trigger and the frame 1 are not fixed with each other. As a result, the end 52 of the trigger directly facing the touch portion 40 is provided with elasticity, and thus after the touch portion 40 is pressed, the trigger 50 may rebound to its original position via the elasticity generated via the fixing mode.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A cover structure, disposed at an electronic device, the electronic device has a frame with an opening and a power supply, the cover structure comprising:
   a cover comprising an inner surface, an outer surface, and a touch portion; and
   a pivotal portion comprising:
      a pivotal part located at the inner surface; and
      a trigger located at the opening of the frame and connected with the pivotal part;
   wherein the touch portion corresponds to the opening, and when the touch portion is pressed, the pivotal part drives the trigger to trigger the power supply to drive the electronic device.

2. The cover structure according to claim 1, wherein a joint of the pivotal part and the trigger is a pivotal point, a rotating axis is formed according to the pivotal point, and the cover rotates around the rotating axis.

3. The cover structure according to claim 2, further comprising a shaft structure, wherein the shaft structure is connected with the pivotal part and the cover and forms a press axis perpendicular to the rotating axis, and the touch portion is pressed along the direction of the press axis.

4. The cover structure according to claim 1, wherein the other end of the cover opposite to the touch portion is fixed at the frame.

5. The cover structure according to claim 1, wherein the electronic device is an optical disk drive (ODD).

6. The cover structure according to claim 1, wherein an extending portion is disposed at another end of the trigger opposite to the joint of the trigger and the pivotal part, and the extending portion is disposed to cooperate with the power supply.

* * * * *